Nov. 30, 1954
O. C. LYTLE
2,695,489
BALING ATTACHMENT FOR TRACTORS
Filed June 22, 1949
3 Sheets-Sheet 1
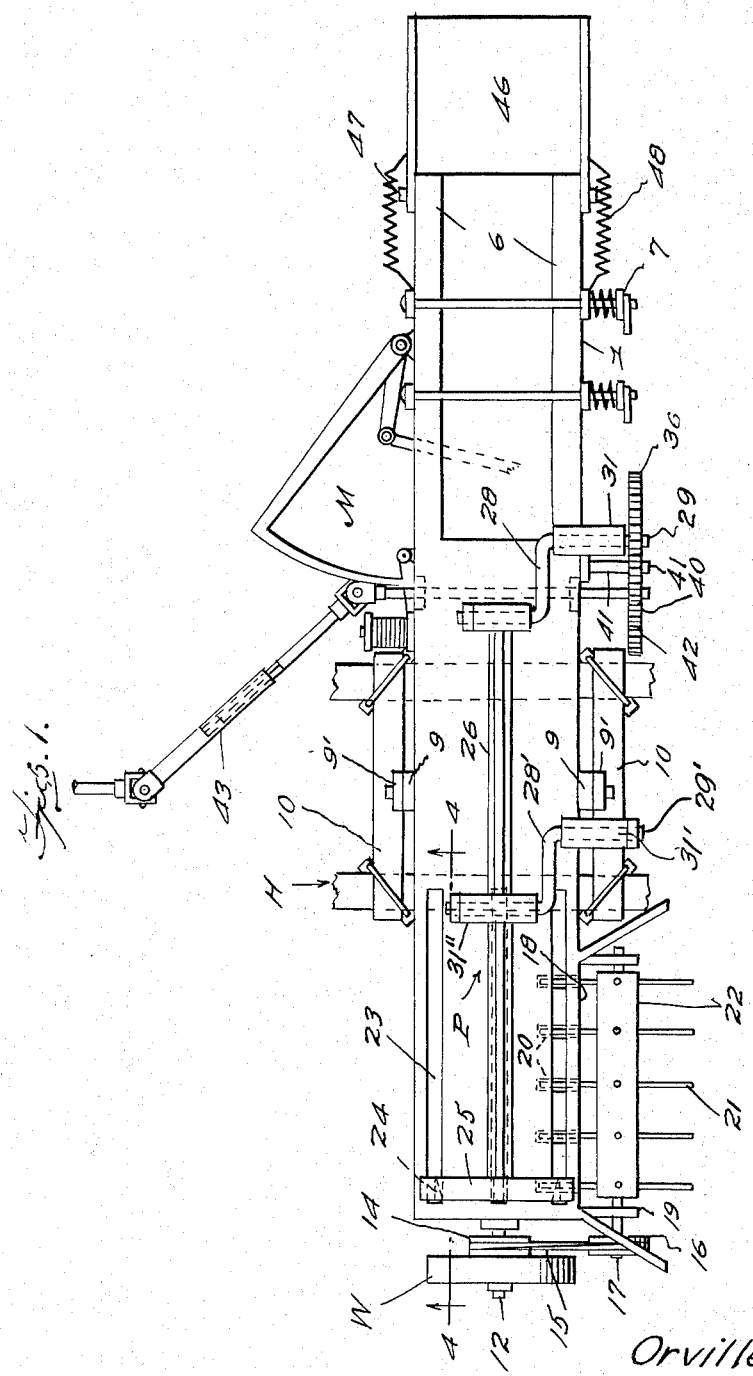
INVENTOR
Orville C. Lytle
BY Wilfred Lawson
ATTORNEY

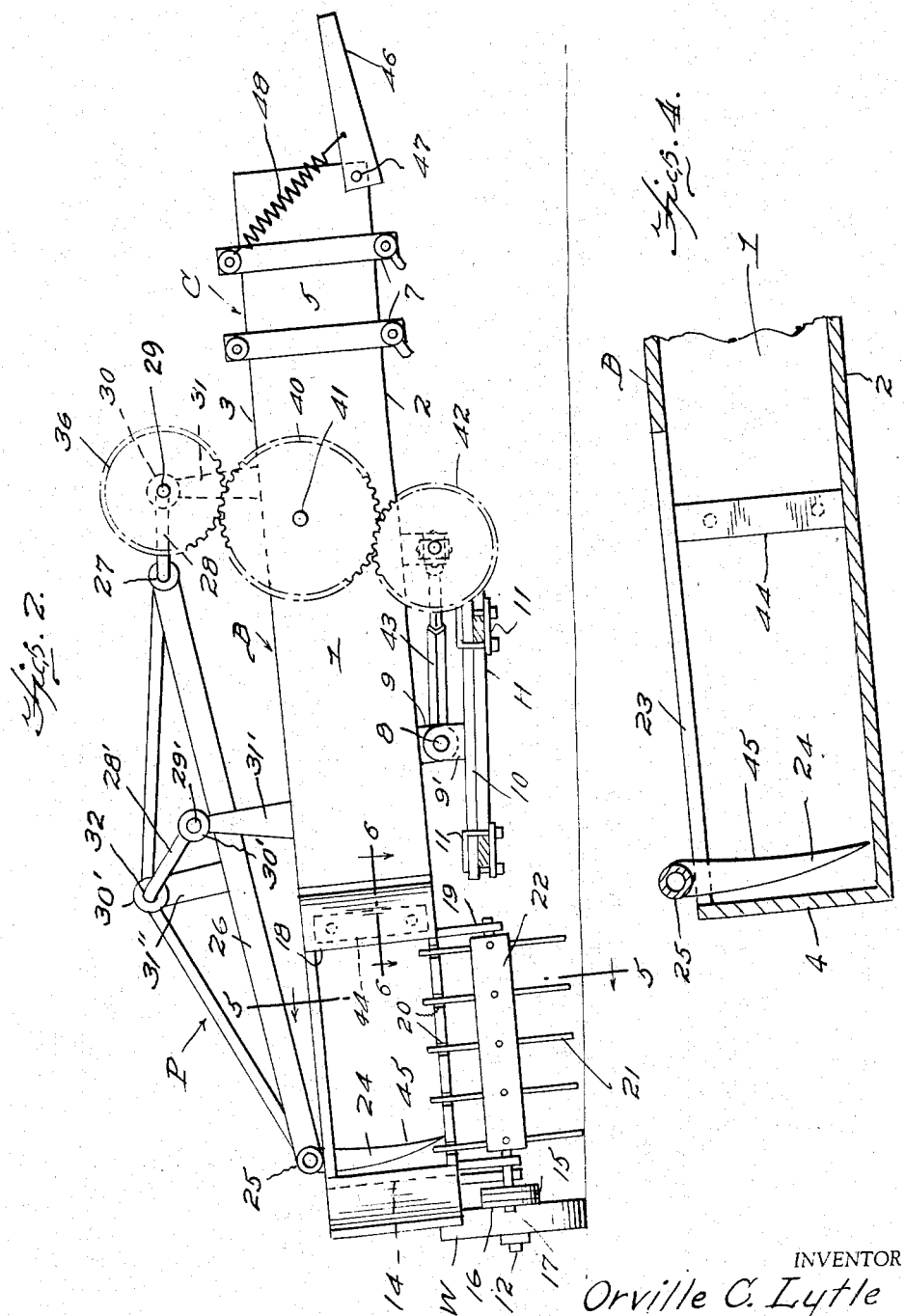

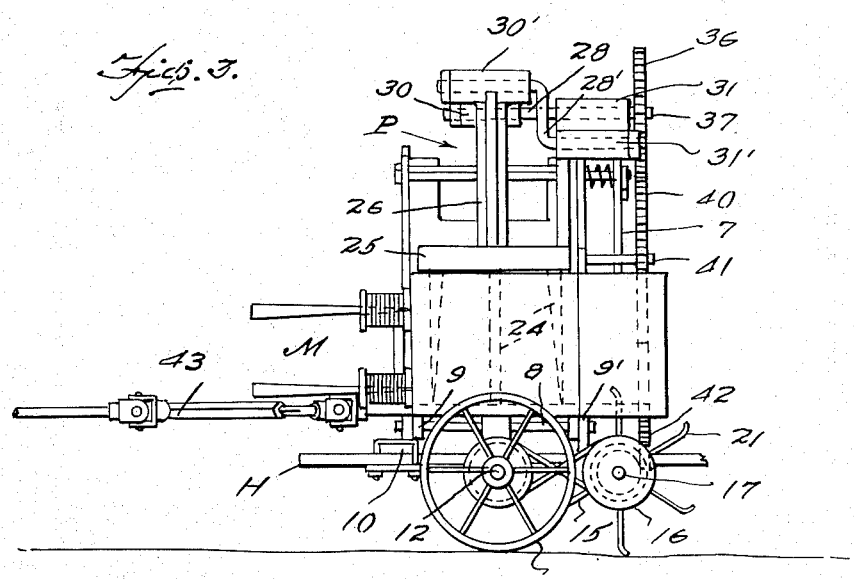
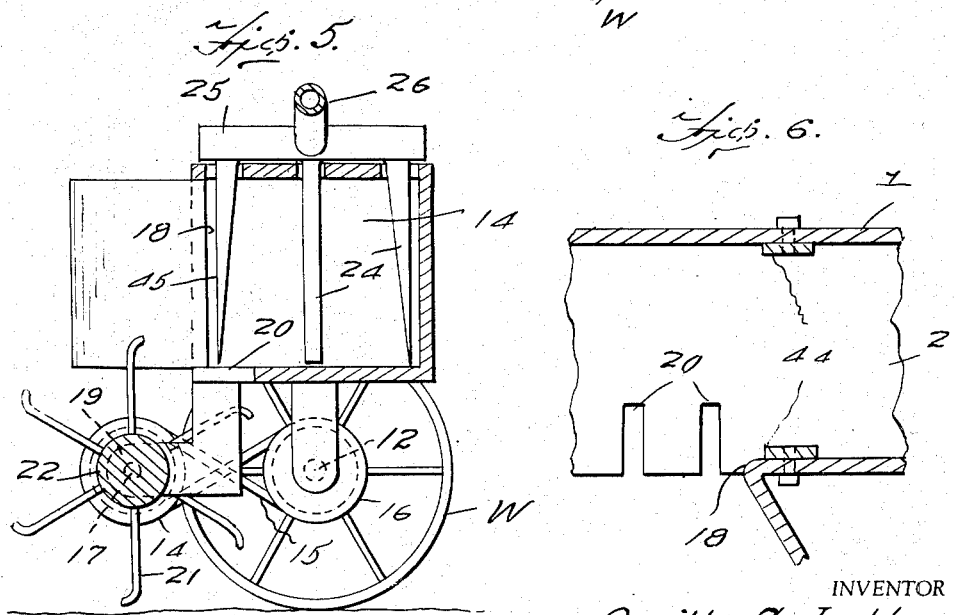

United States Patent Office 2,695,489
Patented Nov. 30, 1954

2,695,489

BALING ATTACHMENT FOR TRACTORS

Orville C. Lytle, Kittanning, Pa., assignor of one-half to Stanley R. Wray, Kittanning, Pa.

Application June 22, 1949, Serial No. 100,595

1 Claim. (Cl. 56—341)

This invention relates to a baling attachment for tractors and it is a particular object of the invention to provide an apparatus of this kind adapted to traverse a field and pick up hay or the like and discharge such harvested material in bales.

It is also an object of the invention to provide an apparatus of this kind with a "straight-through" type and which when in working position has its longitudinal axis disposed in a direction crossing the path of travel of the apparatus and mounted for free swinging movement in up and down direction, one extremity of the apparatus carrying a ground engaging medium normally in contact with the ground surface.

The invention also has for an object to provide an apparatus of this kind including a baling chamber having a feeding entrance in a wall thereof and wherein means are provided to pick up the hay or the like and deliver the same through the entrance opening into the baling chamber.

Furthermore, it is an object of the invention to provide an apparatus of the kind of a "straight-through" type including a baling chamber into which is mechanically delivered from the ground the hay or the like together with a ram element for forcing the hay delivered into the chamber to compress the same.

A still further object of the invention is to provide an apparatus of this kind including a baling chamber and a ram element mounted for recurrent swinging, one stroke of the element imparting pressure upon the hay or the like to compress the same in the chamber and wherein the opposite stroke is free of the material.

The invention consists in the details of construction and in the combination and arrangement of the several parts of my improved baling apparatus, whereby certain advantages are attained, as will be hereinafter more fully set forth.

In order that my invention may be better understood, I will now proceed to describe the same with reference to the accompanying drawings, wherein:

Figure 1 is a view in top plan of a baler constructed in accordance with an embodiment of the invention;

Figure 2 is a view in side elevation;

Figure 3 is a view in end elevation;

Figure 4 is an enlarged sectional view taken substantially on the line 4—4 of Figure 1;

Figure 5 is a sectional view taken substantially on the line 5—5 of Figure 2; and Figure 6 is a fragmentary detail sectional view taken substantially on the line 6—6 of Figure 2.

In the embodiment of the invention as illustrated in the accompanying drawings, B denotes a baling chamber including the side walls 1, a bottom wall 2, a top wall 3, and an outer end wall 4.

The side walls 1 are continued to provide the side walls 5 of the compression chamber C. The upper and lower margins of these walls 5 are provided therealong with the inwardly disposed flanges 6 to facilitate the proper passage of the bales rearwardly between the walls 5. Associated with the walls 5 are the compressing elements 7 of a conventional type and of desired tension.

The baling chamber B and the compression chamber C are comprised in a single unit and adapted to be supported, in part, by and forwardly of a tractor with the longitudinally aligned axial centers of the chamber B and C disposed in a direction crosswise of the path of travel of the portable body and preferably substantially at right angles to such path.

The bottom wall 2 of the chamber B at a predetermined point to one side of the longitudinal center of the unit is provided with the transversely spaced depending bearing lugs or ears 9 through which is directed a heavy duty pivot member 8 held by the upstanding bearing lugs or ears 9, carried by an elongated member 10, suitably clamped, as at 11, or otherwise securely held upon the hitch H or other desired location on a tractor or other desired portable carrier for the unit.

The pivot member 8 is preferably at substantially the transverse center of the portable member and the length of the unit is such to extend beyond opposite sides of the portable body.

The mounting for the unit is also such that the closed end of the baling chamber B will by gravity maintain in contact with the ground surface, a ground engaging wheel W mounted on a stub shaft 12 carried by and extending outwardly from the end wall 4. Rotating with the wheel W, is a pulley 14 with which engages a crossed belt 15.

The belt 15 is also operatively engaged with a pulley 16 fixed to the outer end portion of shaft 17 disposed beneath the receiving or closed end portion of the baling chamber B and disposed lengthwise of the chamber B closely adjacent to the outer or front side wall 1 of the chamber B.

The outer or front wall 1 of the baling chamber B is cutout to provide an entrance opening 18 of desired length and extending from the bottom wall 2 to the top wall 3. The shaft 17, hereinbefore referred to, is rotatably supported by the bearing lugs or ears 19 depending from the bottom wall 2 at points fore and aft of the entrance opening 18.

The front or outer wall 4 at the opposite extremities of the opening 18 carries the forwardly diverging gathering wings to facilitate delivering of hay or the like from the ground or windows into the baling chamber B through the entrance opening 18.

The outer or forward marginal portions of the bottom wall 2 along the entrance opening 18 is provided with the spaced slots 20 disposed transversely of the wall 2 a desired distance thereacross and open at their outer ends. Passing downwardly or from above through these slots 20 are the spring gathering or collecting fingers 21 carried by the roller 22 fixed on the shaft 17 for rotation therewith. These fingers extend out from the periphery of the roller as required and are of such length to engage the hay or the like upon the ground and throw the same into the baling chamber through the entrance opening 18.

The mounting of the unit upon the portable element or structure is such that as the wheel W rolls over the ground the adjacent end portion of the unit will rise and fall in accordance with the surface irregularity encountered and upon dropping movement the fingers 21 will offer no resistance on account of their resiliency.

It is also to be particularly noted that the roller 22 is driven by the wheel W and only when such wheel W is in rolling contact with the ground surface. It is also to be emphasized that such rolling contact of the wheel W is maintained by the weight of the adjacent portion of the unit and thus materially simplifying the construction.

The top wall 3 at the receiving portion of the unit is provided therealong with the parallel slots 23 extending from points in advance of the outer end of the entrance opening 18 to points inwardly thereof. Passing through these slots 23 are the tines 24 depending from the head 25 of the ram element P. The head 25 is carried by the forward end portion of an elongated member 26 and disposed beyond opposite sides thereof. This member 26 overlies the unit and extends lengthwise thereof. The inner portion of this member 26 is operatively engaged, as at 27, with a crank arm 28 of predetermined throw carried by a shaft 29 disposed in a direction transverse of the unit. The shaft 29 is rotatably disposed through and supported by a bearing 30 at the upper extremity of a post 31 mounted upon and extending upwardly from the inner end portion of the top wall 3.

The member 26 at a point approximately at the longitudinal center thereof carries an upstanding and perpendicularly related post 31 having operatively engaged, as at 32, with the upper extremity thereof, a swinging crank arm 28' carried by the shaft 29'. The shaft is rotatably engaged with a bearing 30' at the upper part of the post 31' mounted on and upstanding from the top wall 3. The stroke of the arm 26 and the distance of the shaft 29' above the top wall 3 are such that upon each complete revolution of the shaft 29', the tines 24 of the ram element will be caused to pass down in substantially a straight path of travel through the outer end portions of the slots 23 into the baling chamber and also at a location outwardly of but in close proximity to the outer end of the entrance opening 18. The continued rotation of the shaft 29 is in such direction to then draw the head 25 lengthwise of the chamber B and across the opening 18 in substantially a straight line until the tines 24 of the ram element 25 have passed inwardly beyond the inner end of the opening 18. This travel of the ram element will force the hay or the like contained in the forward portion of the chamber B inwardly under pressure with the resultant formation of a bale which as the operations continue will be discharged out from the outer or open end of the compression chamber C.

When the ram head P reaches the limit of its inward and substantially straight travel the continued rotation of the shaft 29 will result in the head 25 being abruptly raised to bring the tines 24 entirely above the chamber B. The head 25 will also be moved forwardly until reaching the limit of its outwardly movement whereby it will be brought abruptly downward in substantially a straight line to return the tines 24 into required working position within the chamber B to force another charge of hay or the like toward the compression chamber.

In the present embodiment of the invention the shaft 29 is in driven connection, as at 36, with a portion of a shaft 37 rotatably carried by the front side wall 1 of the chamber B. This shaft 37 is also operatively engaged, as at 40, with a stub shaft 41, also carried by the front side wall 1 and to which is coupled, as at 42, an operating shaft 43, which is to be driven from the power take-off shaft of a tractor or by any other desired sources of power.

Rotatably mounted on the inner face of the front side wall immediately adjacent to the inner end of the entrance opening 18, and of a length not less than the height of such opening is a cutting blade 44 and the adjacent tine 24 of the ram head 25 is formed to provide a knife edge 45 for coaction with the blade 44 to obtain a shearing of the hay or the like at the baling end of the charge to assure effective separation of the various layers comprised in the finished bale, each layer, of course, constituting a charge of hay or the like as forced inwardly and compressed by the ram head 25.

The bales may be discharged from the outer or open end of the compression chamber directly upon the ground or, if when desired, may be discharged upon a trailing vehicle through the medium of the chute 46 hingedly connected, as at 47, to the lower portions of the side walls 5 of the compression chamber C. This chute 46 is normally maintained in desired position to receive a bale by the retractile member 48 herein disclosed as coil springs of required tension. The chute is of a length sufficient to rest upon a side board or other part of a trailing vehicle. When the chute is not being employed in connection with a trailing vehicle the weight of a bale pushed out thereon from within the compression chamber C, will cause the chute 46 to swing downwardly to permit the discharge dropping of the bale.

Associated with the baling chamber B is a bale tying mechanism M which may be as preferred, it only be required that such mechanism effect the tying of a bale within a timed sequence. As the tying mechanism M in its construction and operation forms no part of the present part of the present invention, a detailed description and illustration thereof is believed to be unnecessary.

The apparatus is provided or carried at the front end of a tractor or the like but of course, may be carried at the rear.

From the foregoing description it is thought to be obvious that a baling apparatus for hay or the like constructed in accordance with my invention is particularly well adapted for use by reason of the convenience and facility with which it may be assembled and operated.

I claim:

In a hay baler attachment for tractors, an elongated hollow body providing a hay receiving chamber at one end, an intermediate bale forming chamber and a bale delivery chamber at the opposite end, an opening in the front wall of said body communicating with said receiving chamber, hay pickup mechanism carried by said body and operable upon forward movement of said tractor to pick up hay and feed the same into said receiving chamber, the top wall of said body being provided with a plurality of slots communicating with said receiving chamber, a ram for moving hay from said receiving chamber into said forming chamber and compressing the same therein to form a bale, said ram comprising an elongated beam, a link, pivotally attached adjacent one end to said beam substantially midway of the length thereof, said link being pivotally mounted at its opposite end on said body, a plurality of downwardly extending tines secured to said beam adjacent one end thereof in alignment with said slots, a crank shaft rotatably mounted on said body, a crank on said crank shaft pivotally connected to the opposite end of said beam, said link and said crank providing the sole supports for said beam and means for connecting said crank shaft to the power take-off on said tractor whereby upon rotation of said crank shaft said tines will move downwardly in a relatively flat arc into said receiving chamber to a point adjacent the bottom wall thereof and thereafter move in a substantially straight line longitudinally of said receiving chamber for substantially the entire length thereof to move hay into said bale forming chamber and compress the same therein, continued rotation of said crank serving to raise said tines out of said receiving chamber and return the same to the opposite end thereof.

References Cited in the file of this patent

UNITED STATES PATENTS

| Number | Name | Date |
|---|---|---|
| 556,233 | Wickey | Mar. 10, 1896 |
| 600,353 | Bricker | Mar. 8, 1898 |
| 1,808,425 | Markt | June 2, 1931 |
| 1,857,373 | Goggins | May 10, 1932 |
| 2,097,353 | Tallman | Oct. 26, 1937 |
| 2,355,645 | Haase | Aug. 15, 1944 |
| 2,381,620 | Russell | Aug. 7, 1945 |
| 2,489,199 | Russell | Nov. 22, 1949 |